United States Patent [19]
White

[11] 3,765,851
[45] Oct. 16, 1973

[54] GAS PRODUCTION
[75] Inventor: Robert J. White, Pinole, Calif.
[73] Assignee: Chevron Research Company, San Francisco, Calif.
[22] Filed: Dec. 14, 1970
[21] Appl. No.: 98,090

Related U.S. Application Data
[63] Continuation-in-part of Ser. No. 34,834, May 5, 1970.

[52] U.S. Cl.............. 48/209, 48/200, 201/2.5, 252/373, 260/683 R
[51] Int. Cl......... C07c 3/32, C07c 11/02, C10j 3/00
[58] Field of Search.............. 48/209, 111, 197 A, 48/197 R, 200, 202, 210; 23/212, 212 A; 260/666 R, 683 R; 208/8, 9; 201/21, 23, 25, 2.5

[56] References Cited
UNITED STATES PATENTS
2,535,730  12/1950  Gadrat.................................. 23/48
3,556,751  1/1971  Slater et al..................... 48/209 UX Primary Examiner—Joseph Scovronek
Attorney—George F. Magdeburger, Thomas G. DeJonghe, J. A. Buchanan, Jr. and R. H. Davies

[57] ABSTRACT

A process for the production of a synthesis gas and a light olefin which comprises simultaneously contacting an organic feed material containing at least 10 weight percent oxygen and a normally liquid hydrocarbon feedstock with steam in the presence of an alkali metal carbonate catalyst at an elevated temperature.

11 Claims, No Drawings

GAS PRODUCTION

CROSS REFERENCES

This application is a Continuation-in-Part of Application Ser. No. 34,834, filed May 5, 1970, entitled "Catalytic Hydrogen Manufacture," the disclosure of which is incorporated by reference into the present patent application.

BACKGROUND OF THE INVENTION

The present invention relates to the production of synthesis gas and light olefins. More particularly, the present invention relates to the production of hydrogen containing gases by the reaction of carbonaceous material with steam while simultaneously producing olefins such as ethylene.

The term "synthesis gas" is used herein to mean a gas comprising hydrogen and carbon oxides such as carbon monoxide or carbon dioxide The term "synthesis gas" is used in this specification to include fuel gases such as pipeline fuel gases containing substantial amounts of methane.

Synthesis gas can be used for a number of purposes, for example, the carbon oxides can be removed from the synthesis gas, usually after converting essentially all of the carbon monoxide to hydrogen and carbon dioxide, and the resulting purified hydrogen gas used in hydroconversion processes such as hydrocracking to produce jet fuel or gasoline. The synthesis gas can also be used to synthesize methanol from the hydrogen and carbon oxides or to synthesize other chemicals such as ammonia when nitrogen is added to the synthesis gas either after production of the synthesis gas or preferably during the reaction used to produce the synthesis gas. The synthesis gas can be used in a Fischer Tropsch synthesis to form liquid hydrocarbons Also, the synthesis gas can be used to form methane or it can be burned directly as a fuel gas or it can be combined with light hydrocarbons to form a fuel gas, usually after removal of at least part of the carbon oxides or a conversion of carbon monoxide to carbon dioxide.

Various methods have been suggested for the production of synthesis gas or hydrogen-rich gas mixtures. Among these methods are steam-hydrocarbon reforming, partial oxidation of hydrocarbons, Lurgi heavy hydrocarbons gasification, the traditional steam, red-hot coke reaction, and modified methods of reacting carbonaceous matter with steam and oxygen, such as described in U.S. Pat. No. 1,505,065.

The two leading processes, that is, the two processes which are most frequently used to generate hydrogen, are steam-hydrocarbon reforming and partial oxidation of hydrocarbons.

In typical steam reforming processes, hydrocarbon feed is pretreated to remove sulfur compounds which are poisons to the reforming catalyst. The desulfurized feed is mixed with steam and then is passed through tubes containing a nickel catalyst. While passing through the catalyst-filled tubes, most of the hydrocarbons react with steam to form hydrogen and carbon oxides. The tubes containing the catalyst are located in a reforming furnace, which furnace heats the reactants in the tubes to temperatures of 1,200° - 1,700°F. Pressures maintained in the reforming furnace tubes range from atmospheric to 450 psig. If a secondary reforming furance or reactor is employed, pressures used for reforming may be as high as 450 psig to 700 psig. In secondary reformer reactors, part of the hydrocarbons in the effluent from the primary reformer is burned with oxygen. Because of the added expense, secondary reformers are generally not used in pure hydrogen manufacture, but are used where it is desirable to obtain a mixture of $H_2$ and $N_2$, as in ammonia manufacture. The basic reactions in the steam reforming process are:

$C_nH_{2n+2} + nH_2O \rightleftarrows nCO + (2n+1)H_2$
$C_nH_{2n+2} + 2nH_2O \rightleftarrows nCO_2 + (3n+1)H_2$ e.g., methane-steam:

$CH_4 + H_2O \rightleftarrows CO + 3H_2$; and
$CH_4 + 2H_2O \rightleftarrows CO_2 + 4H_2$ In typical partial oxidation processes, a hydrocarbon is reacted with oxygen to yield hydrogen and carbon monoxide. Insufficient oxygen for complete combustion is used. The reaction may be carried out with gaseous hydrocarbons or liquid or solid hydrocarbons, for example, with methane, the reaction is:

$CH_4 + 1/2O_2 \rightleftarrows 2H_2 + CO$

With heavier hydrocarbons, the reaction may be represented as follows:

$C_7H_{12} + 2.8O_2 + 2.1H_2O \rightleftarrows 6.3CO + 0.7CO_2 + 8.1H_2$

Both catalytic and noncatalytic partial oxidation processes are in use. Suitable operating conditions include temperatures from 2,000°F. up to about 3,200°F. and pressures up to about 1,200 psig, but generally presures between 100 and 600 psig are used. Various specific partial oxidation processes are commercially available, such as the Shell Gasification Process, Fauser-Montecatini Process, and the Texaco Partial Oxidation Process.

There is substantial carbon monoxide in the hydrogen-rich gas generated by either reforming or partial oxidation. To convert the carbon monoxide to hydrogen and carbon dioxide, one or more CO shift conversion stages are typically employed. The CO shift conversion reaction is:

$CO + H_2O \rightarrow H_2 + CO_2$

This reaction is typically effected by passing the carbon monoxide and $H_2O$ over a catalyst such as iron oxide activated with chromium.

Production of hydrogen and other gases from waste substances produced in the manfacture of paper from wood chips and the like has been discussed in the literature as, for example, in U.S. Pat. No. 3,317,292. In the manufacture of paper, wood chips are digested, for example, with an aqueous calcium sulfide liquid thereby forming calcium lignin sulfonate waste product in solution, leaving wood pulp behind. As disclosed in U.S. Pat. No. 3,317,292, the waste substances containing lignin-derived organic components can be converted to a gas mixture comprising hydrogen by contacting the waste material with steam in a reaction zone at an elevated temperature at least of the order of several hundred degrees centigrade. The sulfide waste liquor produced in the manufacture of paper from wood chips and the like is a relatively well-defined waste material consisting mostly of lignin-type organic compounds and certain inorganic components, including at least 5 weight percent sulfur calculated as the element sulfur but present usually in the form of sulfur compounds.

The use of catalysts such as potassium carbonate has been disclosed for the reaction of carbon with steam to form hydrogen as is discussed, for example, in Journal of the Americal Chemical Society, Vol. 43, p. 2055 (1921). However, the use of catalysts such as potassium carbonate to catalyze the reaction of organic material containing substantial amounts of oxygen, particularly waste or garbage-type material with steam to form hydrogen does not appear to be disclosed or suggested in the prior art.

U.S. Pat. No. 3,471,275 discloses a method for converting refuse or garbage-type meterial to gases such as gases rich in hydrogen. According to the process disclosed in U.S. Pat. No. 3,471,275, the refuse is fed to a retort and heated therein to a temperature between about 1,650°F. and 2,200°F. The retort is externally heated. According to the '275 patent process, steam is not generally added to the retort. Any steam which is added to the retort according to the process disclosed in the '275 patent is added to the bottom of the retort so that steam would flow counter-current to the waste material which is introduced to the retort at the top of the retort. No catalyst is used in the '275 patent process.

As indicated previously, the present invention is concerned not only with the production of a hydrogen-rich gas from organic feed material, but also with the production of light olefins.

Light olefins are typically produced by thermal cracking of hydrocarbons in the presence of steam at a temperature between about 1,300°F. and 1,650°F. For example, U.S. Pat. No. 3,437,704 discloses a process for cracking a liquid hydrocarbon feedstock to produce ethylene using thermal cracking temperatures between about 1,500° and 1,600°F. According to the ethylene production process described at page 174 of Hydrocarbon Processing, Vol. 46, No. 11 (1967), naphtha or gas oil is converted to ethylene and propylene by thermal cracking at 1,550°F. - 1,650°F. Hydrocarbon feed diluent steam is cracked in a vertical tube furnace at the 1,550°F. - 1,650°F. temperature and then cooled by rapid quench exchange. The quench exchange can be accomplished in various ways, such as by indirect exchange with boiler feed water to generate high pressure steam followed by direct quench with a heavy oil. After quenching the effluent from the cracking furnace, the effluent passes to primary fractionation tower for final cooling and separation of quench oil and fuel oil product, after which it is compressed in a multistage centrifugal compressor to about 500 psi gage. Acid gases are removed and hydrocarbon condensate separated between compression stages is sent to the fractionation system. After the compressed gas is dried and cooled, it passes to a low temperature fractionation system. Residual hydrogen and methane are taken overhead in a demethanizer. The demethanizer bottoms pass to a deethanizer wherein $C_2$'s are taken overhead and hydrogenated to remove acetylene. The acetylene free $C_2$'s flow to an ethylene splitter wherein 99.95 percent ethylene is taken overhead and an ethane stream from the tower bottoms is recycled to cracking. Reflux is supplied by an external ethylene-propylene refrigeration system. The deethanizer bottoms flow to a depropanizer wherein a $C_3$'s stream is taken overhead, and further fractionated into 99.9 percent propylene product and propane.

As indicated in U.S. Pat. No. 3,475,510, usually the design of a cracking furnace or the design of a hydrogen-producing process will depend upon the particular end product desired. When ethylene is desired as the final product, usually only small amounts of hydrogen and carbon oxides are produced in the cracking furnace used to produce ethylene and other light olefins such as propylene. The hydrogen is withdrawn as an incidental stream usually together with $CH_4$. When a hydrogen-rich gas or synthesis gas is desired, usually little if any ethylene and propylene are produced. According to U.S. Pat. No. 3,475,510, a process is provided for increasing the hydrogen and carbon monoxide content in the effluent resulting from the cracking of a feed containing ethane, propane, or naphtha by cracking a feed containing less than 150 ppm sulfur in a nickel-chromium alloy tube at an outlet temperature of 1,400° - 1,600°F. According to U.S. Pat. No. 3,475,510, the hydrogen produced in the cracking furnace is increased from about 1.2 weight percent to 5.8 weight percent by using relatively high temperatures and using nickel-chrome alloy tubes for the cracking furnace.

SUMMARY OF THE INVENTION

According to the present invention, a process is provided for the production of a synthesis gas and a light olefin which process comprises simultaneously contacting an organic feed material, containing hydrogen and at least 10 weight percent oxygen, and a normally liquid hydrocarbon feedstock with steam in the presence of an alkali metal catalyst at an elevated temperature. Normally solid hydrocarbon feedstocks (such as waxy petroleum fractions or residuum oil fractions) can also be used in place of or in addition to the normally liquid hydrocarbon feedstock.

We have found that the defined organic feed material is converted at an unexpectedly high rate to synthesis gas when the conversion is carried out in accordance with the present invention. We have found that the rate of conversion of the organic feed material is particularly fast when a potassium carbonate catalyst is used to accelerate the reaction rate. We have also found that when contacting both an oxygen containing organic feed material and a liquid hydrocarbon such as a gas oil with steam at high temperature and in the presence of an alkali catalyst, that surprisingly high yields of ethylene and propylene are obtained compared to the practically nil yield of ethylene and propylene when contacting only the oxygen containing organic feed with steam. Furthermore, we have found that a very high portion of the feed is converted to valuable gaseous products with only a very small portion of the feed going to the formation of coke. The process of the present invention provides a catalytic water-organic feed material gasification environment that prevents coke build-up due to steam cracking of hydrocarbons. Coke build-up is a severe problem in ordinary steam cracking processes.

The reason for the fast reaction rate for the formation of $H_2$ containing synthesis gas in the process of the present invention is not completely understood, but experimental data indicates that an important factor is the oxygen content of the organic feed material in the process of the present invention. The organic feed material, which in this specification is to be understood to contain hydrogen, as well as carbon, must contain at least 10 weight percent oxygen which can be contrasted to the essentially nil amount of oxygen present in hydrocarbon feedstocks to synthesis gas producing processes such as steam-light hydrocarbon reforming or hydrocarbon partial oxidation. The presence of oxygen in the organic feed material in the process of the present invention may contribute to the relatively fast reaction rate by making the feed material more susceptible to reaction with additional steam to produce hydrogen that in the case of hydrocarbon material containing little or no oxygen. We have found that it is particularly preferable in the process of the present invention to produce synthesis gas from organic feed material containing at least 25 weight percent oxygen and still more preferably, between about 35 and 70 weight percent oxygen.

We have also found that organic feed material containing the oxygen substantially in the form of polyhydroxylated compounds is particularly advantageous from the standpoint of high reaction rates with steam to form synthesis gas. Feeds containing oxygen in the form of polyhydroxylated compounds are meant to include carbohydrates such as cellulose and sugars.

The oxygen and the hydrogen content in the organic feed material are to be understood as chemically combined oxygen and hydrogen, i.e., oxygen and hydrogen which are connected through one or more chemical bonds to the carbon present in the organic feed material.

It is preferred in the process of the present invention to use an organic oxygen containing feed material which contains less than 5 weight percent sulfur. The sulfur is calculated as the element sulfur, although for those undesired and excluded feedstocks, the sulfur is usually present as a compound as, for example an organic sulfur compound or an inorganic sulfur compound present in the feed material. Thus, it is to be understood that the organic feed material contacted with steam according to the process of the present invention is free from a high percentage of inorganic or organic sulfur compounds, i.e., that the feed contains less than 5 weight percent sulfur either as sulfur chemically combined with the organic feed material or as inorganic sulfur compounds physically mixed with the organic feed material. Feeds such as Kraft black liquor produced as a waste material in the manufacture of paper pulp are not suitable in the process of the present invention because of the relatively high content of sulfur compounds in the Kraft black liquor. It is undesirable to have substantial amounts of sulfur feed to the reaction zone in the process of the present invention because of the increased reactor cost and, more particularly, because of the increased problems in removing sulfur compounds from the synthesis gas produced in the reactor. It is preferred that the sulfur content of the organic feed material be below about 3 weight percent sulfur.

The catalyst used in the process of the present invention is preferably an alkali metal catalyst, as we have found particularly high reaction rates using alkali metal catalysts Potassium carbonate has been found to be preferred among the alkali metal catalysts. Other catalysts comprising Group VIII metals such as nickel can be used in the process of the present invention, but the conversion rate, except for the use of nickel catalysts, is not as rapid as with the surprisingly active alkali metal catalysts in the process of the present invention. Also, the alkali metal catalysts such as $K_2CO_3$ are not easily poisoned by sulfur and they are usually relatively easily recovered because of their solubility in water. The alkali metal catalysts include lithium, sodium, potassium, rubidium, and cesium.

Preferably, the alkali metal is added to the reaction zone by contacting the feed to the reaction zone with a solution of a salt of the alkali metal catalyst. The salts of the alkali metal catalyst include salts such as sulfates and chlorides. Although it is preferred to add the alkali metal catalyst to the reaction zone in the form of a carbonate, it is suitable to add the catalyst in other salt forms such as phosphates, acetates, formates, sulfates, and chlorides, or in the hydroxide or oxide form.

We have found that particularly suitable organic feed material for the process of the present invention includes lignite, wood, and solid waste material, including material commonly referred to as garbage. We have found that high reaction rates are obtained in the process of the present invention for the conversion of solid waste material to synthesis gas. The term "solid waste material" or "solid waste" is used herein to include solid municipal waste or common garbage, sewage, industrial waste such as sawdust, and agricultural waste such as corn husks and other discarded cellulosic material.

In both the case of solid waste materials and other organic feed material satisfying the requirements of the present invention, preferred amounts of the catalysts as a weight percentage of the organic feed material are from 1 to 50 weight percent and particularly preferred amounts are from 5 to 20 weight percent. When using the particularly preferred potassium carbonate catalyst, about 2 to 15 weight percent potassium carbonate is preferably impregnated into the feed before contacting the feed with steam in the reaction zone.

One of the reactions occurring in the process of the present invention is the reaction of cellulosic material or sugar-type material with steam to produce hydrogen and carbon oxides. The cellulosic and sugar-type material can be considered on the basis of a simple sugar such as glucose for which the following reaction applies:

$$C_6H_{12}O_6 + 6H_2O \rightarrow 6CO_2 + 12H_2$$

Unlike a similar reaction where water is added to methane or carbon, the above reaction has a negative free energy change ($\Delta F$) at 25°C. so that, on the basis of thermodynamics, the reaction can occur at room temperatures. However, we have found that the reaction rate is very slow at room temperatures. Therefore, elevated temperatures are preferred in the reaction zone according to the process of the present invention. However, it is particularly preferred in the process of the present invention to use temperatures below 1,600°F. Higher temperatures result in excessive heat requirements, increased reactor cost and also lower yields of hydrogen. The use of alkali metal carbonate catalysts in the process of the present invention greatly increases the reaction rate of the organic feed material with steam to form synthesis gas, making it particularly attractive to use temperatures below 1,600°F. in the process of the present invention for the production of synthesis gas. Thus, preferably the contacting of the organic feed material with the steam is carried out in a reaction zone at a temperature between about 500° and 1,600°F. and more preferably, between about 700° and 1,600°F. Temperatures between 800° and about 1,200° or 1,400°F. are particularly preferred. At these temperatures, we have found that the reaction of the organic feed material with steam is a surprisingly attractive route to produce hydrogen-rich gas, with relatively high $H_2$ yields and relatively low heat requirements. Temperatures between 500° and 3,000°F. are operable in the process of the present invention but temperatures below 1,600°F. are preferred for the reasons given above.

The hydrogen-rich gas or synthesis gas produced in the process of the present invention is believed to be primarily attributable to the oxygen containing organic feed, although at least a portion of the synthesis gas is derived from the liquid hydrocarbon feed which is fed to the reaction zone in addition to the oxygen containing organic feed results in the production of substantial amounts of light olefins. Suitable normally liquid hydrocarbon feedstocks include naphtha, gas oil and residuum hydrocarbon feedstocks. Gas oil feedstocks are particularly preferred. The term "gas oil" is used herein to mean hydrocarbon feedstocks derived from petroleum, shale, coal, or the like, and boiling within the range of about 400° to 1,150°F., preferably within the range of about 500° – 1,000°F.

It is particularly preferred to maintain a reaction temperature between about 1,000° and 1,400°F. for the conversion of the combined oxygen containing organic feed and liquid hydrocarbon feed such as gas oil to synthesis gas and light olefins. The use of a temperature between about 1,000° and 1,400°F. has been found to result in relatively rapid reaction rates for the formation of synthesis gas, particularly when the reaction is carried out in the presence of an alkali metal catalyst, as well as relatively fast reaction rates to form light olefins such as ethylene and propylene while at the same time coke formation is maintained at a relatively low level and metallurgical and other problems resulting from higher temperatures are avoided.

The reaction of the combined feedstocks to form synthesis gas and light olefins can be carried out over a wide range of pressures from about 1 atmosphere to about 200 atmospheres, but lower pressures in the range of about 1 atmosphere to 10 atmospheres are preferred.

EXAMPLE

Table I below lists comparative gas analyses for the gas obtained from the contacting of an oxygen containing organic feedstock with steam at about 1,200°F. in the presence of an alkali metal catalyst versus the gas produced in contacting both the oxygen containing organic feed and a liquid hydrocarbon feedstock with steam at about 1,200°F. in the presence of an alkali metal catalyst. In previous experimental runs, various types of oxygen containing organic feed materials were used without added liquid hydrocarbon and essentially no light olefins were produced.

In the particular experimental run for which the results are tabulated in Table I below, the oxygen containing organic feed consisted of wood which was finely subdivided, i.e., wood in the form of sawdust. Approximately 25 grams of the finely divided wood and 10 grams of heavy coker gas oil (which has a boiling range of about 500° to 1000°F. and a gravity of about 24° API) were contacted with steam at about 1,200°F. in the presence of 2.5 grams of potassium carbonate catalyst. As can be seen from comparative Table I below, the gas oil was converted primarily to methane, ethylene and propylene. Only about 0.3 mole percent methane was produced when feeding only the oxygen containing organic feedstock as can be seen from Column 1, whereas about 9.1 percent methane was produced when the gas oil was added to the oxygen containing organic feedstock, as can be seen from Column 2. Also, as can be seen from Column 2, the added gas oil resulted in the production of about 7.1 volume percent ethylene and about 4.5 volume percent propylene.

Very little solids remained after contacting the feedstocks, either separately or combined, with steam at about 1,200°F. in the presence of the potassium carbonate catalyst. Less than five weight percent of the total feed in the case of the combined feedstocks went to the formation of coke.

TABLE I

GAS ANALYSES, MOLE %

| | Col. 1 Oxygen-Containing Organic Feed | Col. 2 Oxygen-Containing Organic Feed Plus Gas Oil Feed |
|---|---|---|
| Methane | 0.3 | 9.1 |
| Ethane | — | 2.3 |
| Ethylene | — | 7.1 |
| Propylene | — | 4.5 |
| $C_4+$ | — | 2.2 |
| Carbon Monoxide | 3.0 | 4.5 |
| Carbon Dioxide | 31.6 | 20.3 |
| Hydrogen | 65.1 | 50.0 |

As can be seen from the gas analyses reported in Column 2 above, the process of the present invention results in the production of a substantial amount of hydrogen-rich synthesis gas in addition to the production of light olefins. Preferably, the light olefins are separated to obtain a stream of ethylene, or ethylene and propylene, as product valuable chemicals, and a synthesis gas stream is separated for use in any of numerous applications such as a fuel gas stream comprising hydrogen, methane, variable amounts of carbon oxides, and variable amounts of ethane.

Thus, the main processing steps or zones in the present invention are the reaction facilities zone and the separation facilities zone.

Heat recovery facilities are also necessary between the reaction zone and the separation zone in order to cool the hot effluent from the reaction zone and achieve satisfactory thermal efficiency.

The reaction facilities zone can contain one or more reactors or furnaces. However, as opposed to the typical tube furnaces used in ethylene production processes, in the process of the present invention it is preferred to use a large reaction zone which receives both the normally liquid hydrocarbon feed and the oxygen containing organic feed. Preferably, the oxygen containing organic feed is a solid feed such as those described herein above.

Heat can be supplied to the reaction zone by adding an oxygen containing gas such as air or molecular oxygen to the reaction zone to burn a portion of the feed material in the reaction zone itself. The heat for the endothermic reactions for the formation of light olefins and hydrogen-rich gas can also be supplied by heating the steam fed to the reaction zone to a sufficiently high temperature to supply the required amount of heat. Heat can also be added indirectly to the reaction zone by various external heating means.

The alkali metal catalyst can be added to the reaction zone separately, for example, by introduction as an aqueous stream to the reaction zone or to a receiving hopper for the reaction zone. The alkali catalyst in the form, for example, of an aqueous solution of potassium carbonate can also be impregnated onto the organic feed material before the organic feed material is introduced to the reaction zone.

The separation facilities following the reaction facilities zone in the process of the present invention basically serve to separate one or more light olefin products from a synthesis gas. Heavy ends remaining in the effluent from the reaction zone can be separated from the reaction zone effluent in a primary fractionator and recycled to the reaction zone or removed as a fuel oil production. When the reaction is carried out at relatively low pressures, it is usually desirable to compress the gaseous products from the reaction zone after separating any heavy ends.

After compression and removal of possible acid gas contaminants, the gaseous effluent can be passed to a demethanizer for the separation of a fuel gas comprising hydrogen and methane. CO shift conversion may be applied to the fuel gas to convert residual amounts of CO remaining in the gas to additional hydrogen and $CO_2$. Also, if the hydrogen is desired for use in a hydroconversion process, a hydrogen-methane separation step can be applied to obtain a methane fuel gas and a hydrogen gas suitable for use in processes such as hydrocracking or hydrotreating.

The bottoms product removed from the demethanizer contains the secondary product of the process of the present invention, i.e., the light olefins including ethylene and propylene. Various well-known processing schemes can be applied to separate the light olefin rich stream into product chemical streams.

Although various embodiments of the invention have been described, it is to be understood that they are meant to be illustrative only and not limiting. Certain features may be changed without departing from the spirit or scope of the invention. It is apparent that the present invention has broad application to the production of a hydrogen-rich gas and light olefins by contacting a combined feedstream of oxygen containing organic material and normally liquid hydrocarbons with steam at elevated temperature, preferably in the presence of an alkali metal catalyst. Accordingly, the invention is not to be construed as limited to the specific embodiments or examples discussed but only as defined in the appended claims or substantial equivalents of the claims.

I claim:

1. A process for the production of a synthesis gas and a light olefin which comprises simultaneously contacting an organic feed material containing at least 10 weight percent oxygen and containing less than 5 weight percent sulfur, and a hydrocarbon feedstock with steam at a temperature in the range 700° to 1,600°F. in the presence of a catalyst comprising a member of the group consisting of alkali metal salts, hydroxides and oxides, said catalyst being present in an amount of 1 to 50 weight percent of said organic feed material.

2. A process in accordance with claim 1 wherein the organic feed material and the normally liquid hydrocarbon feedstock are contacted with the steam at a temperature between about 1,000° and 1,600°F.

3. A process in accordance with claim 1 wherein the organic feed and the normal liquid hydrocarbon feed are contacted with steam at a temperature between 1,000° and 1,400°F.

4. A process in accordance with claim 1 wherein the normally liquid hydrocarbon feedstock is a gas oil.

5. A process in accordance with claim 1 wherein said catalyst comprises an alkali metal salt.

6. A process in accordance with claim 5 wherein said catalyst comprises a carbonate.

7. A process in accordance with claim 1 wherein the oxygen content of the organic feed material is at least 20 weight percent.

8. A process in accordance with claim 6, wherein said catalyst comprises potassium carbonate.

9. A process in accordance with claim 1, wherein said hydrocarbon feedstock is selected from the group consisting of normally liquid hydrocarbon feedstocks and normally solid hydrocarbon feedstocks.

10. A process in accordance with claim 9 wherein said normally solid hydrocarbon feedstocks are further selected from residuum petroleum fractions and waxy petroleum fractions.

11. A process in accordance with claim 1, wherein said contacting is accomplished at a pressure in the range of 1 to 10 atmospheres.

* * * * *

UNITED STATES PATENT OFFICE
CERTIFICATE OF CORRECTION

Patent No. 3,765,851     Dated  October 16, 1973

Inventor(s)  Robert J. White

It is certified that error appears in the above-identified patent and that said Letters Patent are hereby corrected as shown below:

Title Page, line 2, "[45] Oct. 16, 1973" should read
--[45]*Oct. 16, 1973--.

Title Page, after Item [73] and before Item [22] should read
--[*] Notice: The portion of the term of this patent subsequent to Sept. 18, 1990, has been disclaimed.--.

Title Page, "[56]          References Cited
                        UNITED STATES PATENTS 2,535,730   12/1950   Gadrat...................23/48
    3,556,751   1/1971    Slater et al.............48/290 UX"

should read

--[56]          References Cited
                        UNITED STATES PATENTS 2,535,730   12/1950   Gadrat...................23/48
    3,556,751   1/1971    Slater et al.............48/290 UX
    1,495,776   5/1924    Burdick..................48/210
    2,276,343   3/1942    Reyerson et al...........48/202

Haslam and Russel, Fuels and Their Combustion,
      Pages 68-70 (1st Ed., 1926) TP318H3. A.U. 171--.

Col. 2, line 26, "presures" should read --pressures--.

Col. 3, line 6, "meterial" should read --material--.

Col. 5, line 53, "catalysts Potassium" should read
    --catalysts. Potassium--.

Signed and Sealed this sixth Day of April 1976

[SEAL]

Attest:

RUTH C. MASON
*Attesting Officer*

C. MARSHALL DANN
*Commissioner of Patents and Trademarks*